US012005465B2

(12) United States Patent
Shao et al.

(10) Patent No.: US 12,005,465 B2
(45) Date of Patent: Jun. 11, 2024

(54) ROTARY WATER OUTLET MECHANISM AND FLUSHING DEVICE CONTAINING SAME

(71) Applicant: Spark (Xiamen) Sanitary Ware Co., Ltd., Fujian (CN)

(72) Inventors: Huilong Shao, Fujian (CN); Zhifeng Wu, Fujian (CN); Xiangmou Zhang, Fujian (CN)

(73) Assignee: Spark (Xiamen) Sanitary Ware Co., Ltd., Fujian (CN)

( * ) Notice: Subject to any disclaimer, the term of this patent is extended or adjusted under 35 U.S.C. 154(b) by 205 days.

(21) Appl. No.: 17/587,322

(22) Filed: Jan. 28, 2022

(65) Prior Publication Data

US 2022/0250100 A1 Aug. 11, 2022

(30) Foreign Application Priority Data

Feb. 7, 2021 (CN) ......................... 202120357748.2

(51) Int. Cl.
*B05B 3/04* (2006.01)

(52) U.S. Cl.
CPC .................................. *B05B 3/0422* (2013.01)

(58) Field of Classification Search
CPC ............................ B05B 3/0422; B05B 3/0427
USPC ................................. 239/237, 240, 380, 381
See application file for complete search history.

(56) References Cited

U.S. PATENT DOCUMENTS 8,403,240 B2 * 3/2013 Chen ..................... B05B 3/0422 239/381
9,815,070 B2 * 11/2017 Lin ....................... B05B 1/1636
9,975,128 B2 * 5/2018 Zhou ......................... B05B 3/04

FOREIGN PATENT DOCUMENTS

CN 212405354 U 1/2021

* cited by examiner

*Primary Examiner* — Steven J Ganey
(74) *Attorney, Agent, or Firm* — Cooper Legal Group, LLC

(57) ABSTRACT

A rotary water outlet mechanism and a flushing device, including a housing having a gradually changing curved surface and a water outlet part connected to one end of the housing. A water separator provided with at least one oblique through hole, an impeller and a water guide are provided in sequence in a water flow direction between the housing and the water outlet part. The impeller is in transmission connection with the water guide rotatably connected with the water outlet part, one end of the water guide is provided with a water outlet. The water flow enters the housing, and under a guidance of the gradually changing curved surface of the housing, the water flow passes through the oblique through hole, and flows through the impeller and drives the impeller to rotate, such that the water guide rotates to generate a rotating water flow.

8 Claims, 5 Drawing Sheets

ROTARY WATER OUTLET MECHANISM AND FLUSHING DEVICE CONTAINING SAME

RELATED APPLICATIONS

The present disclosure claims priority to Chinese Patent Application No. 202120357748.2, filed on Feb. 7, 2021, which is incorporated herein by reference.

TECHNICAL FIELD

The present disclosure relates to a water outlet mechanism, in particular to a rotary water outlet mechanism and a washing device containing the same.

BACKGROUND

Generally, existing flushing devices obtain different flushing structures by changing the structure of the water body. For example, CN212405354U discloses a multifunctional bubbler, which includes a water inlet connector and a water outlet assembly rotatably connected to the water inlet connector, and the bottom of the water inlet connector is provided with water outlet holes. The end surface of the water outlet assembly is provided with a bubble water inlet hole and a blade water inlet hole. The inside the water outlet assembly is formed with a bubble water channel communicated with the bubble water inlet hole and a blade water channel communicated with the blade water inlet hole. The bottom of the water outlet assembly is formed with a bubble water nozzle and a blade water nozzle communicated with the blade water channel. The utility model can enable the bubble water inlet hole or the blade water inlet hole selectively to be connected to the outlet hole of the water inlet joint by rotating the water outlet assembly, thereby generating bubble water at the bubble water nozzle or generating a larger washing area at the blade water nozzle, such that the function of the bubbler can be diversified and the scope of application of the bubbler can be improved. Users can specifically choose to use bubble water or blade water for washing according to the washing items.

However, for strong stains, only the blade water can only be used to rinse at a certain angle, and the operator needs to hold the multifunctional bubbler and change the direction to change the rinse angle of the blade water. The existing flushing device cannot perform full flushing well in a fixed installation state.

SUMMARY

In view of the above problems, the present disclosure provides a rotary water outlet mechanism and a flushing device, which adopts a housing with a gradually changing curved surface to restrict the water flow to change the original direction. The water flows through the oblique through hole of the water separator, the impeller is impacted to rotate, thereby driving the water guide to rotate to generate a rotating water flow. Compared with the non-rotating water flow, the cleaning intensity is improved and the cleaning time is saved. Preferably, the present disclosure adopts blade water as the outlet water stream, so as to have the best flushing effect.

In order to solve the technical problem, the present disclosure adopts the following solutions:

A rotary water outlet mechanism comprising a housing and a water outlet part connected to one end of the housing, the housing having a gradually changing curved surface; a water separator, an impeller and a water guide being provided in sequence in a water flow direction between the housing and the water outlet part, the water separator being provided with at least one oblique through hole, the impeller being in transmission connection with the water guide, and the water guide being rotatably connected with the water outlet part, one end of the water guide being provided with a water outlet; when the water flow enters the housing, and under a guidance of the gradually changing curved surface of the housing, the water flow passes through the oblique through hole, and flows through the impeller and drives the impeller to rotate, such that the water guide rotates to generate a rotating water flow.

In a further embodiment, an opening of the housing gradually increases along the water flow direction, and a reinforcing rib is provided on an inner wall of one end of the housing close to the water outlet part, and the reinforcing rib is connected to the water separator.

In a further embodiment, the water separator is provided with 2-10 oblique through holes symmetrically.

In a further embodiment, the oblique through hole is a square hole.

In a further embodiment, the impeller is provided with a central shaft across a center, and the central shaft is fixedly connected to the water outlet part.

In a further embodiment, the water separator is provided with a positioning column at a center, the positioning column is inserted into the center of the impeller, the positioning column cooperates with the central shaft of the center of the impeller, for limiting a rotation of the impeller along the central shaft.

In a further embodiment, an end of the impeller close to the water guide is provided with a driving gear coaxially connected with the impeller, the water guide is provided with at least one driven gear matched with the driving gear; a center of the driven gear is provided with a water guide channel, and the driven gear is in contact with a protrusion of the water outlet part on a water outlet side, such that a seal with the water outlet part is formed, allowing only the water flow pass through the water guide channel provided in the center of the driven gear.

In a further embodiment, the water guide is provided with 2-4 driven gears, and each of the driven gears is engaged with the driving gear respectively.

In a further embodiment, one end of the water guide is provided with a ball valve, a center of the ball valve is opened, and a side of a ball is cut to form an inclined plane; a fluid flows out of the center of the ball valve, and sprays along the inclined plane for producing a blade water flow.

Based on the same inventive concept, the present disclosure further provides a flushing device connected to the rotary water outlet mechanism at a water outlet end.

By adopting the aforementioned technical solution, compared with the prior art, the present disclosure does not require an additional driving device, and uses the power in the water flow process to drive the impeller and drive the water guide to rotate, thereby generating rotating blade water, such that a full range automatic cleaning can be made, without the need for the operator to move and constantly change the flushing angle of the device. Its cleaning effect is good, it can save cleaning time and is easy to use.

DESCRIPTION OF EMBODIMENTS

Figure 1:
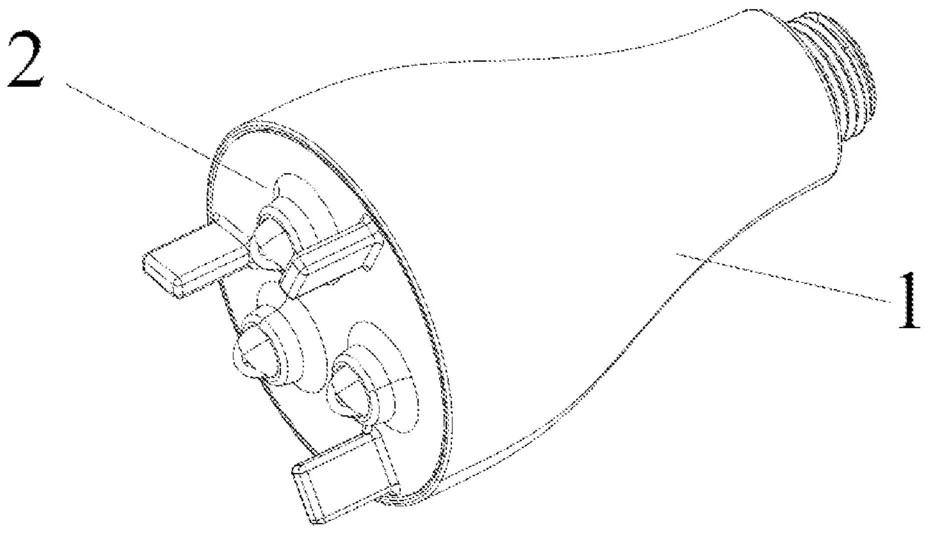
FIG. 1 is a schematic diagram of a three-dimensional structure of the rotary water outlet mechanism according to Example One of the present disclosure.

The technical solutions of the present disclosure will be described clearly and completely below in conjunction with the drawings and specific implementations. However, those skilled in the art will understand that the embodiments described below are part of the embodiments of the present disclosure, rather than all implementations. Embodiments are only used to illustrate the present disclosure, and should not be regarded as limiting the scope of the present disclosure. Based on the embodiments of the present disclosure, all other embodiments obtained by those of ordinary skill in the art without inventive work shall fall within the scope of protection of the present disclosure. If specific conditions are not indicated in the embodiments, it shall be performed in accordance with the conventional conditions or the conditions recommended by the manufacturer. The reagents or instruments used without the manufacturer's indication are all conventional products that can be purchased on the market.

In the description of the present disclosure, it should be noted that the terms "center", "upper", "lower", "left", "right", "vertical", "horizontal", "inner", "outer" and the like that indicate orientation or positional relationship of other indications are based on the orientation or positional relationship shown in the drawings, which is only for the convenience of describing the present disclosure and simplifying the description, and do not indicate or imply that the device or element referred to must have a specific orientation, be constructed and operated in a specific orientation, therefore they cannot be understood as a limitation of the present disclosure. In addition, the terms "first", "second", and "third" are only used for descriptive purposes, and cannot be understood as indicating or implying relative importance.

In the description of the present disclosure, it should be noted that, unless otherwise clearly specified and limited, the terms "installation", "interconnection", and "connection" should be understood in a broad sense. For example, it can be a fixed connection or a detachable connection, or an integral connection; it can be a mechanical connection or an electrical connection; it can be directly connected or indirectly connected through an intermediate medium, and it can be the internal communication between two components. For those of ordinary skill in the art, the specific meanings of the above-mentioned terms in the present disclosure can be understood under specific circumstances.

Example One

Figure 2:
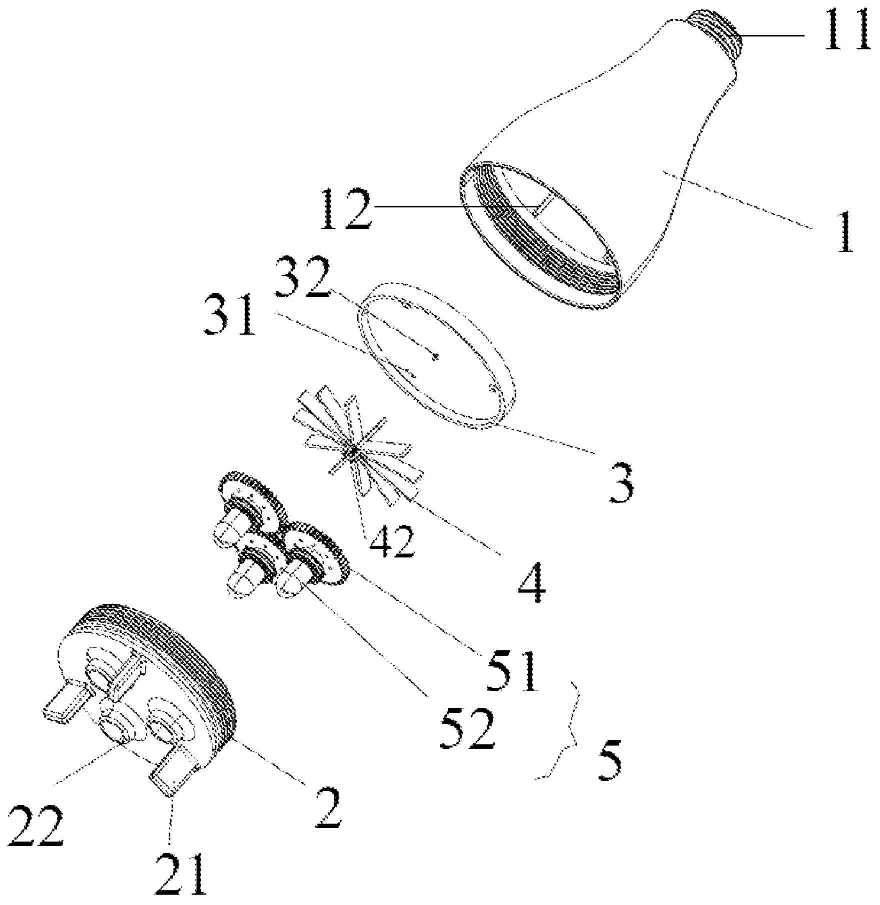
FIG. 2 is an exploded view of the rotary water outlet mechanism according to Example One of the present disclosure.

Referring to FIGS. 1 and 2, the rotary water outlet mechanism may include a housing 1 and a water outlet part 2, both of which are threadedly connected. In an enclosed cavity formed by the housing 1 and the water outlet part 2, a water separator 3, an impeller 4, and a water guide 5 may be provided in sequence along the water flow direction.

The housing 1 may have a gradually changing curved surface, and preferably an opening thereof gradually increases along the water flow direction, similar to a bulb structure. The water inlet end of the housing 1 may be provided with a connecting thread 11, for connecting with a water supply end, such as a water pipe or a faucet, or the like. With the gradual structure in the embodiment, the flow resistance can decrease after the fluid enters, the water flow can speed up, and diverge in different directions, and the disturbing effect can be enhanced.

Preferably, a reinforcing rib 12 is provided on the inner wall of one end of the housing 1 close to the water outlet part 2, and the reinforcing rib 12 is connected to the water separator 3 to protect the strength of the housing 1 and increase the service life. The water outlet part 2 may be provided with a number of baffles 21 on the side of the water outlet, which not only protects the user from accidental injury by the rotating body, but also prevents water splashes during the rotation of the blade water. At the same time, the baffle 21 can support the rotary water outlet mechanism to stand upright, which is convenient for installation and fixation near the object to be cleaned. The water outlet part 2 is rotatably connected with the water guide 5 so that the water guide 5 can rotate relative to the water outlet part 2. For example, in the embodiment, the water outlet part 2 defines through holes 22 adapted to the water guide 5.

The water separator 3 may be symmetrically provided with three oblique through holes 31, the water separator 3 may be in the shape of a disc, and the adjacent oblique through holes 31 can form an angle of 120° with the center of the disc. Preferably, the oblique through holes 31 are square holes, and the oblique direction between the oblique through holes 31 forms a center symmetry with the center of the disc. In other embodiments, the number of the oblique through holes 31 may be 1, 2, or 10, depending on the water flow requirements. The water body flows to the impeller 4 through the oblique through holes 31, and since the direction of the water flow is oblique, the impeller 4 is flushed to rotate.

Figure 3:
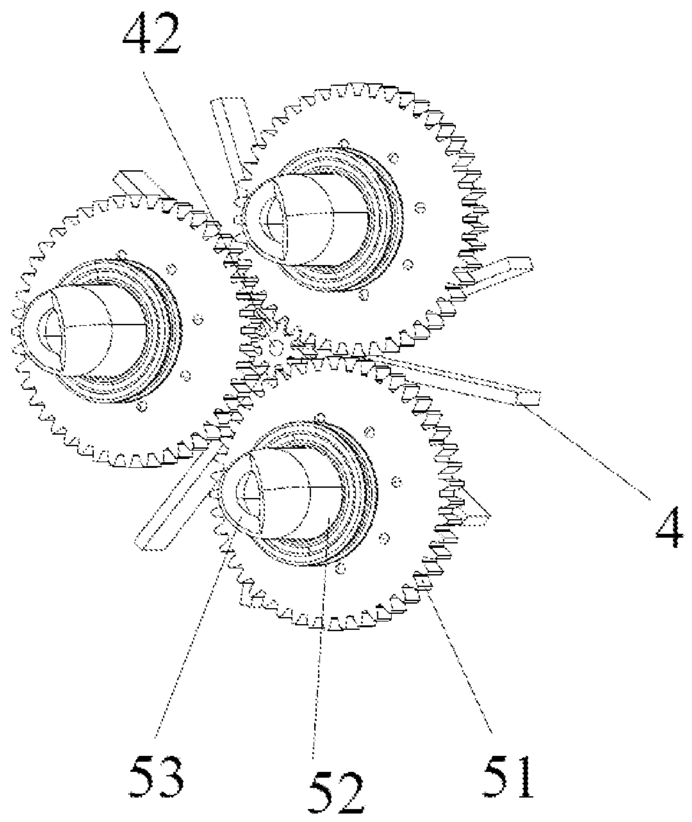
FIG. 3 is a schematic view of the structure of the impeller and the water guide according to Example One of the present disclosure.
Figure 4:
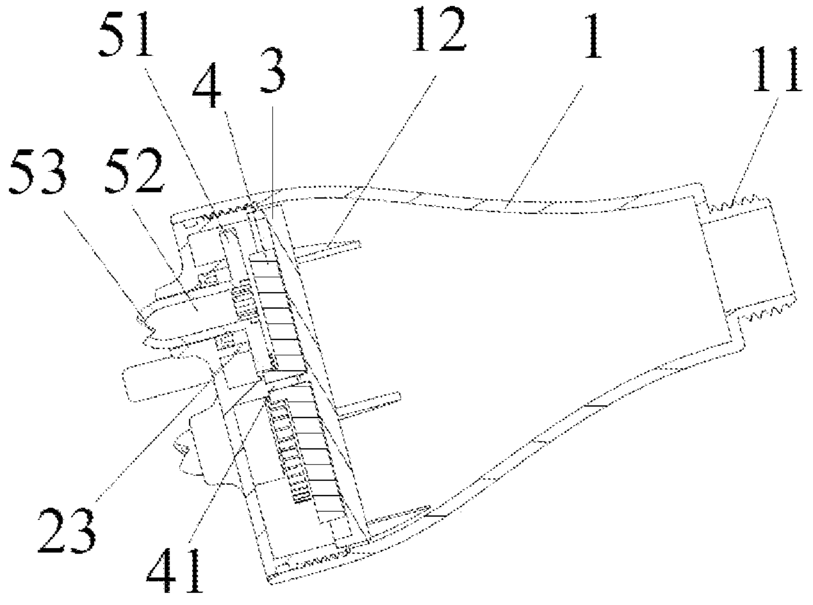
FIG. 4 is a cross-sectional view along the central plane of the rotary water outlet mechanism according to Example One of the present disclosure.

Referring to FIGS. 2, 3 and 4, the structures of the impeller 4 and the water guide 5 are described in detail. The center of the impeller 4 is throughout provided with a central shaft 41, and the central shaft 41 is fixedly connected to the water outlet part 2. The impeller 4 rotates about the central shaft 41 as an axis. In order to improve the stability of the rotation of the impeller 4, a positioning column 32 can be provided in the center of the water separator 3. The positioning column 32 is inserted into the center of the impeller 4. The positioning column 32 is close to or in contact with the central shaft 41. They cooperate with each other, for limiting a rotation of impeller 4 about the central shaft 41, without excessive deviation in the extending direction of the central shaft 41.

The impeller 4 and the water guide 5 may be connected in transmission, and the optional modes include gear transmission, worm gear transmission, chain transmission, and the like. In the embodiment, the gear transmission structure is shown. One end of the impeller 4 close to the water guide 5 is provided with a driving gear 42 coaxially connected with the impeller 4, and the center of the driving gear 42 passes through the central shaft 41. The water guide 5 is symmetrically provided with three driven gears 51 that cooperate with the driving gear 42. The driven gear 51 abuts against the protrusion 23 of the water outlet part 2 on the water outlet side, thereby forming a seal with the water outlet part 2, and only allows water to flow through the water guide channel 52 provided in the center of the driven gear 51, and the water guide channel 52 passes through the through holes 22 on the water outlet part 2. The end of the water guide channel 52 is a water outlet, preferably, a blade water outlet, or can be bubble water, shower water, or the like.

The blade water outlet can adopt the current design, and in the embodiment, a ball valve structure is adopted. Referring to FIG. 3, the ball valve 53 may have a hole in the center and is cut along the side of the ball to form an inclined surface. After the fluid flows out through the center of the ball valve, it is sprayed along the inclined surface, thereby generating blade water.

Figure 5:
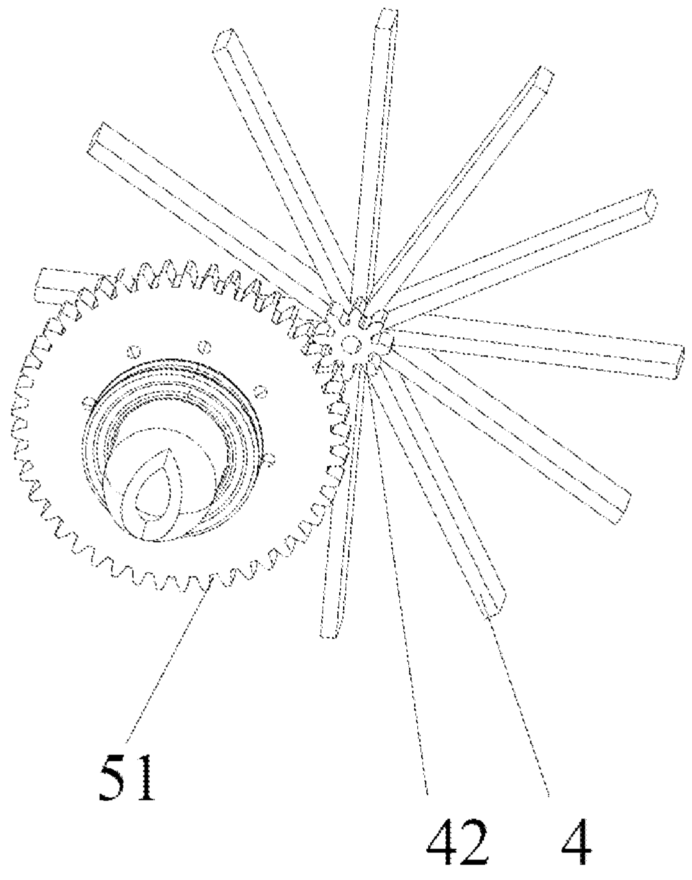
FIG. 5 is another structural schematic diagram of the impeller and the water guide according to Example One of the present disclosure.

In the present disclosure, the number of driven gears 51 in the water guide 5 is not limited to three, and can be two or four. In practice, only one driven gear 51 can rotate and release water, as long as the driven gear 51 is engaged with the driving gear 42, as shown in FIG. 5.

The working principle of the above-mentioned rotary water outlet mechanism is as follows: water flow enters the housing 1; guided by the gradually changing curved surface of the housing 1, the water flow passes through the oblique through holes 31, flows through the impeller 4 and drives the impeller 4 to rotate, thereby causing the water guide 5 to rotate, such that rotary blade water is generated.

Although the embodiments of the present disclosure have been shown and described above, it can be understood that the above-mentioned embodiments are exemplary and cannot be construed as limiting the present disclosure. Those of ordinary skill in the art make changes, modifications, replacements, and deformations to the above-mentioned embodiments within the scope of the present disclosure without departing from the principle and purpose of the present disclosure.

What is claimed is:

1. A rotary water outlet mechanism, comprising:
- a housing; and
- a water outlet part connected to one end of the housing, wherein:
  - the housing has a gradually changing curved surface,
  - a water separator, an impeller, and a water guide are provided in sequence in a water flow direction between the housing and the water outlet part,
  - the water separator is provided with at least one oblique through hole,
  - the impeller is in transmission connection with the water guide,
  - the water guide is rotatably connected with the water outlet part,
  - one end of the water guide is provided with a water outlet,
  - water enters the housing and, under a guidance of the gradually changing curved surface of the housing, the water passes through the at least one oblique through hole and flows through the impeller and drives the impeller to rotate, such that the water guide rotates to generate a rotating water flow,

- a reinforcing rib is provided on an inner wall of the one end of the housing close to the water outlet part,
  - the reinforcing rib is connected to the water separator,
  - the impeller is provided with a central shaft across a center of the impeller,
  - the central shaft is fixedly connected to the water outlet part,
  - the water separator is provided with a positioning column at a center of the water separator,
  - the positioning column is configured for insertion into the center of the impeller,
  - the positioning column cooperates with the central shaft of the center of the impeller to limit a rotation of the impeller along the central shaft; and
  - the water outlet part is provided with a number of baffles on a side of the water outlet.

2. The rotary water outlet mechanism according to claim 1, wherein: an opening of the housing gradually increases along the water flow direction.

3. The rotary water outlet mechanism according to claim 1, wherein the at least one oblique through hole is 2-10 oblique through holes symmetrically arranged about the water separator.

4. The rotary water outlet mechanism according to claim 1, wherein the at least one oblique through hole is a square hole.

5. The rotary water outlet mechanism according to claim 1, wherein:
- an end of the impeller close to the water guide is provided with a driving gear coaxially connected with the impeller,
- the water guide is provided with at least one driven gear matched with the driving gear,
- a center of the at least one driven gear is provided with a water guide channel, and
- the at least one driven gear is in contact with a protrusion of the water outlet part on a water outlet side, such that a seal with the water outlet part is formed, allowing the water to only flow through the water guide channel provided in the center of the at least one driven gear.

6. The rotary water outlet mechanism according to claim 5, wherein:
- the at least one driven gear is 2-4 driven gears, and
- each of the 2-4 driven gears is engaged with the driving gear respectively.

7. The rotary water outlet mechanism according to claim 1, wherein:
- the one end of the water guide is provided with a ball valve,
- a center of the ball valve is opened,
- a side of a ball is cut to form an inclined plane, and
- a fluid flows out of the center of the ball valve and sprays along the inclined plane to produce a blade water flow.

8. A flushing device connected to the rotary water outlet mechanism according to claim 1 at a water outlet end.

* * * * *